United States Patent [19]
Son

[11] Patent Number: 5,963,387
[45] Date of Patent: Oct. 5, 1999

[54] METHOD FOR FORMING AND PROCESSING DATA ADDRESS MARK FOR HARD DISK DRIVE

[75] Inventor: Ok-Hyun Son, Suwon, Rep. of Korea

[73] Assignee: SamSung Electronics Co., Ltd., Suwon, Rep. of Korea

[21] Appl. No.: 08/924,246

[22] Filed: Sep. 5, 1997

[30] Foreign Application Priority Data

Sep. 5, 1996 [KR] Rep. of Korea ...................... 96-38461

[51] Int. Cl.⁶ .................................................. G11B 5/09
[52] U.S. Cl. ................................ 360/49; 360/48; 360/53
[58] Field of Search .................... 360/48, 51, 53, 360/49

[56] References Cited

U.S. PATENT DOCUMENTS

| | | | |
|---|---|---|---|
| 4,618,898 | 10/1986 | Young et al. | 360/51 |
| 5,210,660 | 5/1993 | Hetzler | 360/51 |
| 5,231,545 | 7/1993 | Gold | 360/49 |
| 5,347,207 | 9/1994 | Otsuki | 360/59 |
| 5,384,671 | 1/1995 | Fisher | 360/51 |
| 5,420,730 | 5/1995 | Moon et al. | 360/77.08 |
| 5,438,559 | 8/1995 | Best | 369/54 |
| 5,442,499 | 8/1995 | Emori | 360/77.08 |
| 5,475,540 | 12/1995 | Gold | 360/48 |
| 5,477,103 | 12/1995 | Romano et al. | 318/601 |
| 5,517,631 | 5/1996 | Machado et al. | 360/77.08 |
| 5,523,903 | 6/1996 | Hetzler | 360/77.08 |
| 5,544,135 | 8/1996 | Akin et al. | 369/32 |
| 5,581,418 | 12/1996 | Hasebe | 360/51 |
| 5,589,998 | 12/1996 | Yu | 360/78.14 |
| 5,627,693 | 5/1997 | Hirukawa | 360/49 |
| 5,627,695 | 5/1997 | Prins et al. | 360/51 |
| 5,631,783 | 5/1997 | Park | 360/51 |
| 5,696,745 | 12/1997 | Yamawaki | 369/59 |
| 5,825,569 | 10/1998 | Kim et al. | 360/51 |

*Primary Examiner*—Aristotelis M. Psitos
*Assistant Examiner*—Regina Y. Neal
*Attorney, Agent, or Firm*—Robert E. Bushnell, Esq.

[57] ABSTRACT

A method for constructing and processing a data address mark positioned in a data track of a magnetic disk immediately preceding a data region storing user data to establish synchronization requested for reading user data from the magnetic disk. The method includes recording of the data address mark in at least two different recording locations of the data track; and when one data address mark recorded in the different recording locations of the data track is normally detected to establish synchronization requested for reading user data from the magnetic disk, regarding the one data address mark as an effective data address mark of a corresponding data region.

15 Claims, 4 Drawing Sheets

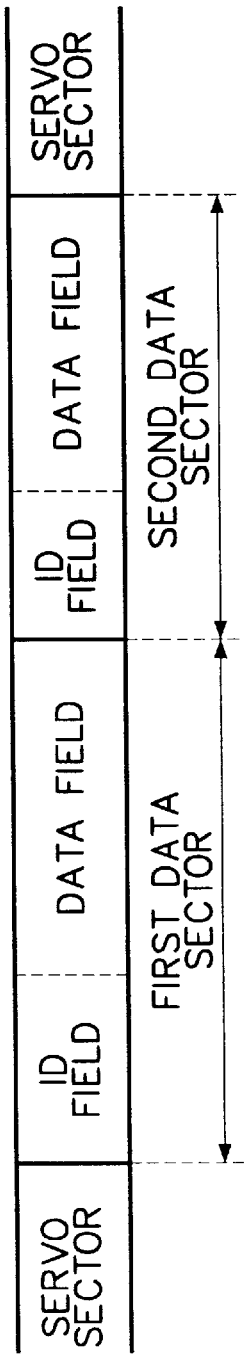
FIG. 1 *(Prior Art)*
FIG. 2 *(Prior Art)*

| DATA PREAMBLE | DATA ADDRESS MARK | DATA | ECC | DATA POSTAMBLE |

FIG. 3

| DATA ADDRESS MARK | DATA | ECC |

FIG. 4

METHOD FOR FORMING AND PROCESSING DATA ADDRESS MARK FOR HARD DISK DRIVE

CLAIM FOR PRIORITY

This application makes reference to, incorporates the same herein, and claims all benefits accruing under 35 U.S.C. §119 from an application for METHOD FOR CONSTRUCTING AND PROCESSING DATA ADDRESS MARK FOR HARD DISK DRIVE earlier filed in the Korean Industrial Property Office on the Sep. 5, 1996, and there duly assigned Ser. No. 38,461/1996, a copy of which application is annexed hereto.

BACKGROUND OF THE INVENTION

1. Technical Field

The present invention relates to a data address mark for a hard disk drive and, more particularly, relates to a method for forming and processing data address mark for hard disk drive in order to improve production yield.

2. Related Art

Hard disk drive is widely used as an auxiliary memory device of a computer system because it can access a large amount of data at high speed. Generally, hard disk drive utilizes a recording form based on constant-track capacity to record and reproduce data to and from a magnetic disk. In this recording form, the hard disk drive rotates at a constant velocity, and information capacity per track of inner tracks of a magnetic disk is the same as that of outer tracks. However, information recording density of the outer tracks is lower than that of the inner tracks because the outer track is substantially larger than the inner tracks. Consequently, the storage efficiency of the magnetic disk is minimal.

One popular technique to increase the information recording density of a magnetic disk is a recording type of constant linear density (CLD) or zone-bit recording. In the constant linear density recording form, all tracks including inner and outer tracks contain the same information density in order to improve the information capacity of the magnetic disk. Moreover, an information recording area of the magnetic disk is split into a plurality of zones so as to have constant recording density in a radial direction from the center of the magnetic disk. The number of data sectors is differently assigned to the tracks of each split zone. That is, the tracks of an outer zone have the number of the data sectors more than the tracks of an inner zone. The data sector designates a unit area for accessing data on the magnetic disk by the hard disk drive and has the same size, 512 bytes for example, irrespective of the position of the magnetic disk. If an embedded sector servo system as disclosed, for example, in U.S. Pat. No. 5,210,660 for Sectored Servo Independent Of Data Architecture issued to Hetzler, U.S. Pat. No. 5,384,671 for PRML Sampled Data Channel Synchronous Servo Detector issued to Fisher, U.S. Pat. No. 5,420,730 for Servo Data Recovery Circuit For Disk Drive Having Digital Embedded Sector Servo issued to Moon et al., U.S. Pat. No. 5,475,540 for Magnetic Data Storage Disk Drive With Data Block Sequencing By Using ID Fields After Embedded Servo Sectors issued to Gold, is used to provide position information of a transducer (head), one data sector may split into two segments according to each area on the magnetic disk. In such an embedded sector servo system, each data track is divided into a servo information area and a data information area which are alternatively provided in a radial direction of the magnetic disk. The servo information area is an area into which servo information is written and provides a servo sector. The data information area is an area into which actual data information is written and provides a data sector.

Typical data sector includes a plurality of identification (ID) regions, data regions and PAD regions serving as intersector gaps therebetween. Commonly, the ID region includes an ID preamble, an ID address mark (AM), a cyclic redundancy check code (CRC) and an ID postamble. The data region includes a data address mark (AM), data and an error correction code (ECC). Generally, in order to read information of the ID region and the data region of the respective data section, the HDD must be synchronized with a clock frequency previously written on the magnetic disk by using the ID sync and data sync. In practice however, the ID preamble requires many bytes that are restrictive for high density HDD application.

Another technique to improve information recording density in hard disk drives in recent years is known as a recording type of headerless sector format as disclosed, for example, in U.S. Pat. No. 5,500,848 for Sector Servo Data Recording Disk Having Data Regions Without Identification (ID) Fields issued to Best et al, U.S. Pat. No. 5,523,903 for Sector Architecture For Fixed Block Disk Drive issued to Hetzler et al., U.S. Pat. No. 5,581,418 for Magnetic Disk Drive Unit Capable Of Determining Data Region Position Of Data Region That Does Not Include Position Identification Data issued to Hasebe, U.S. Pat. No. 5,627,695 for System And Method For Generating Unique Sector Identifiers For An Identificationless Disk Format issued to Prins, and U.S. Patent No. 5,589,998 for Cylinder Address Storage In Multiple Servo Sectors Of A Track issued to Yu. In Best et al. '848, for example, a fixed block architecture sector format that includes information encoded in the servo region of a sector to enable a data recording head to locate and identify data sector for read and write operations without the need of an ID region. Similarly, Hetzer et al. '903 and Hasebe '418 each discloses a sector architecture that further includes information contained in electronic storage to enable the data recording head to locate and identify data sectors for read and write operations without using data ID fields. Likewise, Prins '695 and Yu '998 also disclose a disk drive system for determining sector ID of a data sector on a disk without using ID fields in order to maximize disk capacity.

Generally, servo sector of the HDD using a headerless servo format includes a preamble region for synchronizing with a system clock, a servo address mark (SAM) region for recording a reference pattern for producing various servo timing signals, an index (IDX) region for supplying a single rotation information of the disks, a sector number region for recording a servo sector number, a head number region for recording the head number, a gray code region for recording track information, a servo burst region for the on-track control of the heads and a postamble region. Common servo address mark (SAM) detection scheme maybe disclosed, for example, in U.S. Pat. No. 5,231,545 for Fault Tolerant RLL Data Sector Address Mark Decoder issued to Gold, U.S. Pat. No. 5,442,499 for Method Of Detecting Sector Servo Information In A Disk System issued to Emori, and U.S. Pat. No. 5,544,135 for Fault Tolerant Servo Address Mark For Disk Drive issued to Akin, Jr. et al.

Meanwhile, data sector of HDD using a headerless servo format includes a data preamble region, a data address mark, data, an error correction code (ECC) and a data postamble. The data address mark informs that the data is started and provides necessary synchronization when data is recorded on or read from the magnetic disk. Data is the actual digital information stored in the magnetic disk. ECC is an error detecting code for detecting and correcting an error of the data. The data postamble provides a necessary timing margin after reading the data. Since the ID post amble is adjacent to the data preamble, and the data postamble is adjacent to the ID preamble, they are mixedly used.

In contemporary HDD using the headerless recording format, if there is occurrence of a defect in a data area, damaged data can be restored by using the ECC. If there is occurrence of a defect in a data address mark area, however, it is difficult if not impossible to restore the damaged data address mark. As a result, since the data address mark is not detected, data positioned at a rear area following the data address mark cannot be normally accessed. Moreover, if such a data field is over tolerance limits, the HDD needs to be repaired or discarded, thereby losing valuable operational time and financial resources.

SUMMARY OF THE INVENTION

Accordingly, it is therefore an object of the present invention to provide a disk drive using a data sector format having readily accessible data address mark that is suitable for high density recording.

It is also an object to provide a disk drive and a method for forming a data address mark in plural different recording patterns in a data sector of a magnetic disk and processing the same in order to minimize non-detection of such a data address mark in the data sector.

These and other objects of the present invention can be achieved by a method for forming and processing a data address mark positioned in a data track of a magnetic disk immediately preceding a data region storing user data to establish synchronization requested for reading user data from the magnetic disk. The method includes the steps of recording of the data address mark in at least two different recording locations of the data track; and when one data address mark recorded in the different recording locations of the data track is normally detected to establish synchronization requested for reading user data from the magnetic disk, regarding the one data address mark as an effective data address mark of a corresponding data region.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 illustrates a general track format of a magnetic disk;

FIG. 2 illustrates a detailed format of an ID field of the data sector as shown in FIG. 1;

FIG. 3 illustrates a detailed format of a data field of the data sector as shown in FIG. 1;

FIG. 4 illustrates a detailed format of a data field of a magnetic disk using a headerless servo recording;

DETAILED DESCRIPTION OF THE PREFERRED EMBODIMENT

Figure 5:
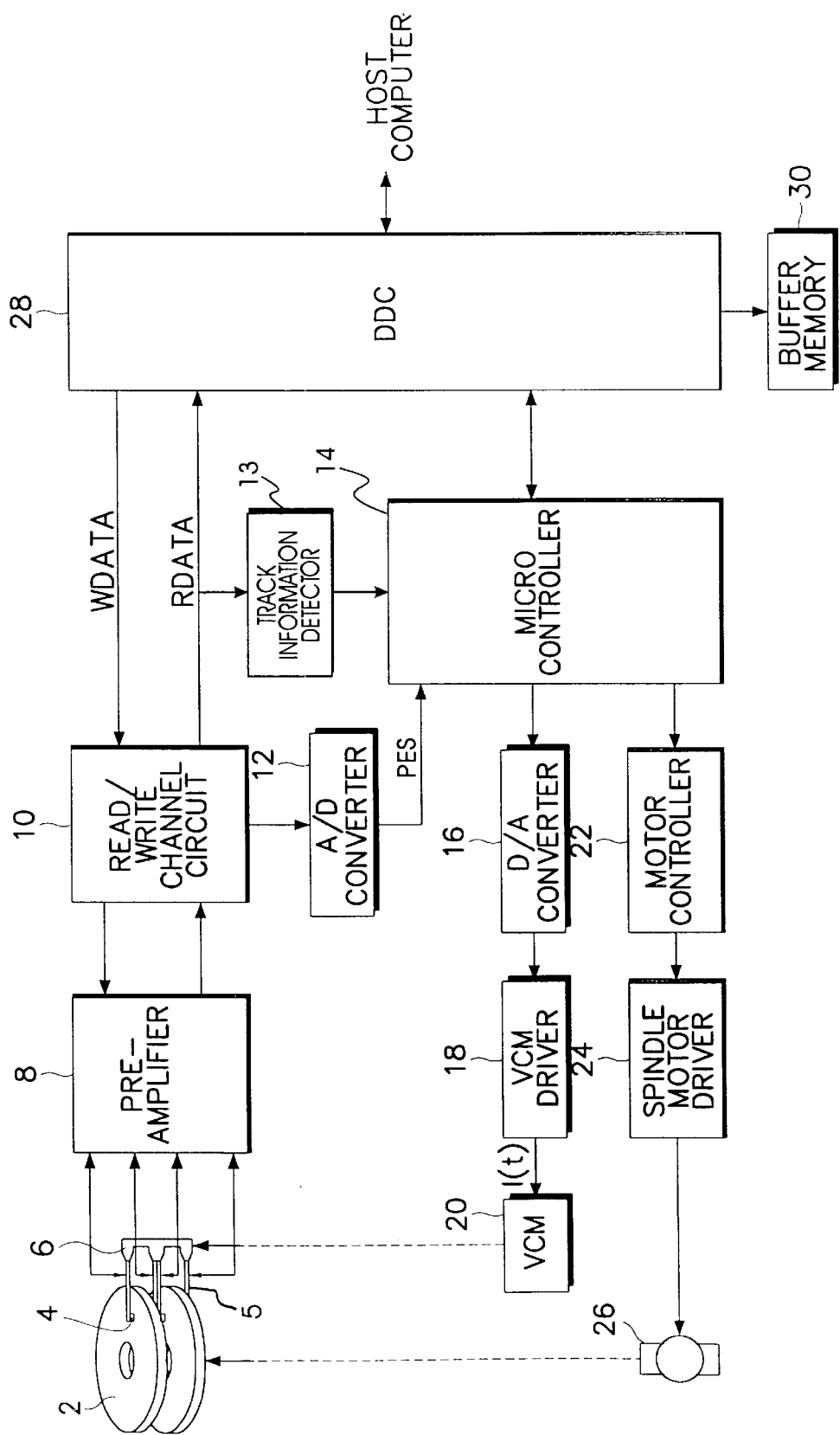
FIG. 5 is a block diagram of a hard disk drive constructed according to the principles of the present invention.

Referring now to the drawings and particularly to FIG. 1, which illustrates a general track sector format of a magnetic disk using constant density recording. As shown in FIG. 1, the track sector format includes two successive data sectors between servo sectors of a magnetic disk with each data sector is subdivided into an identification (ID) field and a data field. Header information for identifying a corresponding data sector is written into the ID field. Actual digital data is written into the data field preceded by the ID field.

ID field consists of an ID preamble, an ID address mark, an ID, a cyclic redundancy code (CRC) and an ID postamble, as shown in FIG. 2. The ID preamble provides clock synchronization for the ID field during reading and simultaneously provides a gap before the ID field. The ID address mark informs that the ID is started and provides synchronization for reading the ID. The ID is the header information for identifying the sector in which a head is currently positioned, such as a sector number, a head number, a cylinder number, etc. The CRC is an error detecting code for detecting an error of the ID address mark and the ID. Generally, the CRC is generated by using a CRC-CCITT generating polynomial. The ID postamble provides a necessary timing margin after reading the ID.

Data field consists of a data preamble, a data address mark, data, a CRC and a data postamble, as shown in FIG. 3. Meanwhile, the data field of the magnetic disk using a headerless servo recording system is formed as shown in FIG. 4. The data preamble positioned between the ID postamble and a data synchronizing bit provides clock synchronization for the data field during reading and simultaneously provides a gap between the ID field and the data field. The data address mark informs that the data is started and provides necessary synchronization when the magnetic disk driving apparatus reads the data. The data is the actual digital information stored in the magnetic disk. An error correcting code (EEC) is an error detecting code for detecting and correcting an error of the data. The data postamble provides a necessary timing margin after reading the data. Generally, since the ID post amble is adjacent to the data preamble, and the data postamble is adjacent to the ID preamble, they are mixedly used.

In contemporary disk drives using the above-described recording format, as I have described earlier, if there is occurrence of a defect in a data area, damaged data can be restored by using the ECC. However, if there is occurrence of a defect in the data address mark area, it is difficult if not impossible to restore the damaged data address mark. As a result, since the data address mark is not detected, data positioned at the data area following the data address mark cannot be normally accessed. Moreover, if such a data field is over tolerance limits, the disk drive needs to be repaired or discarded, thereby causing valuable time loss and economic loss.

Turning now to FIG. 5, which illustrates a high density hard disk drive HDD constructed according to the principles of the present invention. The HDD includes, for example, two magnetic disks 2 and corresponding four transducer heads 4, a transducer head assembly 6 in an E-shape having actuator arms 5 each for supporting a respective pair of transducer heads 4, a preamplifier 8, a read/write channel circuit 10, an analog-to-digital (A/D) converter 12, a track information detector 13, a micro-controller 14, a digital-to-analog (D/C) converter 16, a voice coil motor (VCM) driver 18, a voice coil motor 20, a motor controller 22, a spindle motor driver 24, a spindle motor 26 for rotating the magnetic head 4 across the surface of the disk 2, and a disk data controller (DDC) 28.

Preamplifier 8 is electrically connected to the transducer head assembly 6 for amplifying a predetermined signal read out from the disk 2 using the transducer head 4 and transmitting the amplified signal to the read/write channel circuit 10. For the purpose of writing data onto the disk 2, the preamplifier 8 applies encoded writing data transmitted from the read/write channel circuit 10 to a designated transducer head from the magnetic heads 4 to be recorded on the disk 2. At this time, the preamplifier 12 selects one of the magnetic heads 2 according to a control signal generated from a disk data controller (DDC) 28 under the instruction of a micro-controller 14.

Read/write channel circuit 10 is connected between the preamplifier 8 and the DDC 28 for decoding data pulses from an input signal received from the preamplifier 8 to generate read-out data RDATA, and for decoding writing data WDATA received from the DDC 28 to transmit the decoded WDATA to the preamplifier 8. The read/write channel circuit 10 generates a phase error signal (PES) by decoding head position information, i.e., a part of servo information, which is recorded on the disk. The PES is then transmitted to the micro-controller 14 via the A/D converter 12. At this stage, the A/D converter 12 converts the PES into a digital value corresponding to a predetermined level and transmits the converted PES to the micro-controller 14.

Track information detector 13 is connected between the read/write channel circuit 10 and the micro-controller 14 for detecting from the RDATA, a track number for the current position of the transducer head 4 and providing the detected data to the micro-controller 14. The DDC 28 is controlled by the micro-controller 14 to record the data received from a host computer via the read/write channel circuit 10 and the preamplifier 8 or to transmit the data read out from the disk 2 to the host computer.

Micro-controller 14 controls the DDC 28 according to a command received from the host computer to search a track and position of the transducer head. In doing so, the micro-controller 14 uses the track number and the PES input from the track information detector 13 and the A/D converter 12, respectively. The D/A converter 16 is connected to the micro-controller 14 for converting the digital signal output from the micro-controller 14 into an analog signal for controlling the position of the transducer heads 4. A VCM driver 18 generates a driving current for driving a VCM 20 according to the analog signal input from the D/A converter 16. The VCM 20 drives the transducer heads 4 to move in a radial direction of the disk 2 corresponding to the level of the driving current input from the VCM driver 18.

Motor controller 22 is connected to the micro-controller 14 for controlling a spindle motor driver 24 according to a disk rotation control command output from the micro-controller 14. The spindle motor driver 24 drives a spindle motor 26 in accordance with the control of the motor controller 22 to thereby rotate the disk 2.

Figure 6:
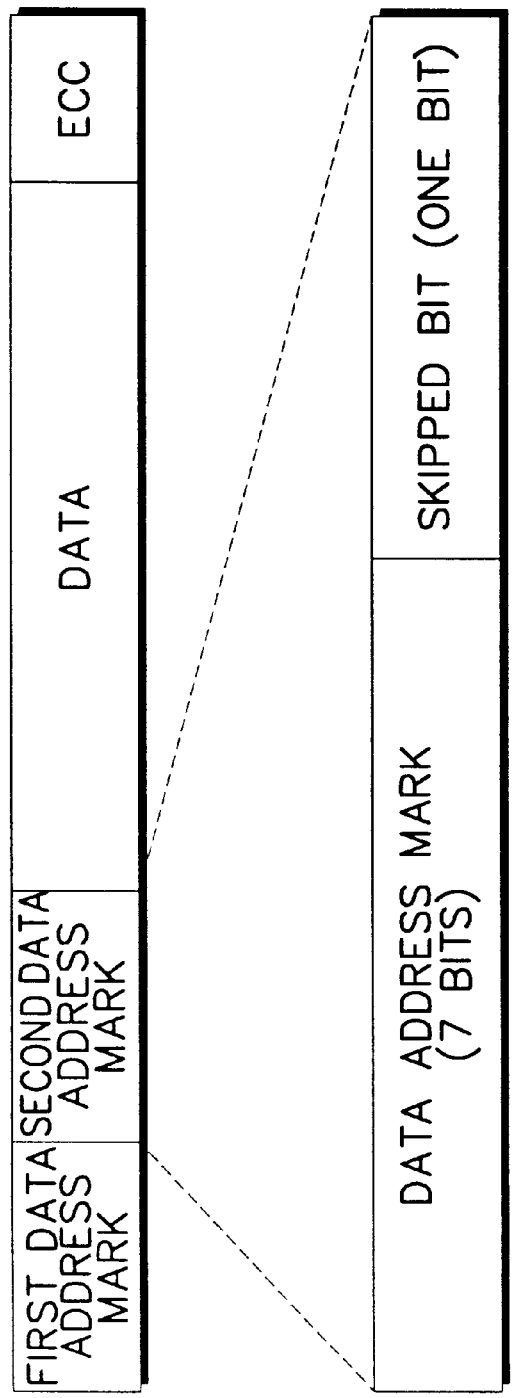
FIG. 6 illustrates a detailed format of a data field according to the principles of the present invention.

Refer to FIG. 6 which illustrates a detailed format of a data field constructed according to the principles of the present invention. Data address marks are constructed by 2 bytes. During the write operation of each sector, both first and second data address marks are written, and the write operation is not concerned in the generation of an ECC. The two data address marks are respectively distinguished by using different patterns, and is discriminated by the micro-controller 14.

For example, the first data address mark is defined as "A1" and the second data address mark is defined as "A2". The 7 most significant bits select any pattern defined as a user pattern and the least significant bit is used for counting the data address mark constructed by 2 bytes. During the read operation of each sector, when only one byte of data address mark is detected among 2 bytes of data address marks, it is regarded as an effective data address mark. That is, if the first data address mark is normally detected, the second data address mark of one byte is skipped and the following information is regarded as data. If the first address mark has a defect, however, the second data address mark is detected. If it is determined whether the second data address mark is normally detected, the following information is regarded as data. Whether the read data address mark is the first data address mark or the second data address mark is distinguished by the recording patterns as previously determined during the write operation. Meanwhile, the micro-controller 14 should provide a masking function for the data address mark.

For example, if only the 7 most significant bits are normally detected at the same time of detecting data address mark constructed by 8 bits, the micro-controller 14 skips the number of byte as many as the number of the least significant bit remained, and regards the following information as data. Accordingly, even if there is occurrence of defect in data address mark of one byte, the following data address mark is normally detected, thereby lowering possibility of concluding drive to be faulty due to non-detection of the data address mark. It should be noted here that while the data address mark as described is constructed by 2 bytes, it may be possible to construct the data address mark by 2 or more bytes.

As described above, the present invention has an advantage in that when one of data address marks recorded with different patterns is normally detected, data address mark of a corresponding data field is regarded as an effective value in order to maximize production yield of the disk drive due to non-detection of the data address mark.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for forming and processing a data address mark positioned in a data track of a magnetic disk preceding a data region in a disk drive to establish synchronization requested for reading user data from the magnetic disk, said method comprising the steps of:

recording of said data address mark in at least two different recording locations of said data track;

when one data address mark recorded in said different recording locations of said data track is normally detected to establish synchronization requested for reading user data from the magnetic disk, regarding said one data address mark as an effective data address mark of a corresponding data region; and skipping a remaining data address mark recorded in said different recording locations of said data track, when any one data address mark recorded in said different recording locations is normally detected.

2. The method of claim 1, said at least two different recording locations corresponding to at least a first location and a separately located second location, said data address mark recorded in said first location being in accordance with a first pattern, and said data address mark recorded in said second location being in accordance with a second pattern different from said first pattern.

3. The method of claim 2, further comprised of each of said data address mark recorded in said different recording locations of said data track being constructed of one byte of information.

4. The method of claim 3, further comprised of bits constructing said one byte being utilized for recording said data address mark and for counting the number of byte of said remaining data address mark.

5. The method of claim 4, further comprised of said data address mark being detected by a controller of said disk drive performing a masking function with respect to said data address mark.

6. The method of claim 1, further comprised of said data address mark being detected by a controller of said disk drive performing a masking function with respect to said data address mark.

7. A method for forming and processing a data sector comprising an identification field and a data field in a magnetic disk of a headerless servo recording system, comprising the steps of:

recording a data address mark, during a recording mode, in at least two different locations of said data field immediately preceding a data area containing user data;

detecting said data address mark recorded in said different locations of said data field, during a reading mode, to confirm validity of user data contained in said data area following said data address mark;

when said data address mark recorded in at least one of said different locations of said data field is detected, regarding said one data address mark as an effective data address mark of a corresponding data area for confirming the validity of user data contained therein; and skipping a remaining data address mark recorded in said different recording locations of said data track, when said data address mark recorded in said at least one of said different recording locations is detected.

8. The method of claim 7, said at least two different locations corresponding to at least a first location and a separately located second location, said data address mark recorded in said first location being in accordance with a first pattern and said data address mark recorded in said second location being in accordance with a second pattern different from said first pattern.

9. The method of claim 7, further comprised of each of said data address mark recorded in said different recording locations of said data field being constructed of one byte of information.

10. The method of claim 7, further comprised of said identification field comprising an identification preamble, an identification address mark, an identification area for providing said identification information, a cyclic redundancy code, and an identification postamble.

11. A disk drive, comprising:

a data recording disk having a plurality of concentric tracks, each track having servo sectors in which servo information for use in positioning a transducer head is written and succeeding data sectors, each data sector including:

an identification region in which identification information for use to identify the data sector for reading and writing operations is written;

at least two different data address mark regions for use to indicate a validity of data recorded on said data sector is written;

a data region in which data transferred from an external communication device is written; and an error correction code region in which an error correction code for use to automatically correct an error is written;

said transducer head for writing data to and reading data from the data sectors of the data recording disk, and for reading servo position information from the servo sectors of the data recording disk;

means attached to the transducer head for positioning the head across the tracks to perform said read and write operations; and said transducer head not utilizing a remaining data address mark recorded in said different recording locations of said data track, when a data address mark recorded in said two different data address regions is detected.

12. The disk drive of claim 11, further comprised of said transducer head detecting data address marks recorded in at least two different data address mark regions of said data field, during said reading mode, to confirm validity of user data contained in said data area following said data address mark, and when at least one data address mark recorded in said two different data address mark regions of said data field is detected, regarding said one data address mark as an effective data address mark of a corresponding data area for confirming the validity of user data contained therein.

13. The disk drive of claim 12, said at least two different data address mark regions of said data field corresponding to at least a first region and a separately located second region, said data address mark recorded in said first region being in accordance with a first pattern and said data address mark recorded in said second region being in accordance with a second pattern different from said first pattern.

14. The disk drive of claim 11, further comprised of each data address mark recorded in said two different data address mark regions of said data field being constructed of one byte of information.

15. The disk drive of claim 11, further comprised of said identification field comprising an identification preamble, an identification address mark, an identification area for providing said identification information, a cyclic redundancy code, and an identification postamble.

* * * * *